United States Patent [19]

Moriya et al.

[11] 4,437,684

[45] Mar. 20, 1984

[54] AUTOMATIC SEATBELT SYSTEM

[75] Inventors: Shigeru Moriya; Akio Yoshida, both of Toyota; Muneharu Matsunami, Seto; Tatsushi Kubota, Okazaki; Hiroshi Tsuge, Chiryu; Yuji Nishimura, Nagoya, all of Japan

[73] Assignees: Toyota Jidosha Kogyo Kabushiki Kaisha; Kabushiki Kaisha Tokai-Rika-Denki-Seisakusho, both of Seisakusho, Japan

[21] Appl. No.: 309,687

[22] Filed: Oct. 8, 1981

[30] Foreign Application Priority Data

Oct. 17, 1980 [JP] Japan ............................ 55-147940[U]

[51] Int. Cl.³ ............................................. A62B 35/02
[52] U.S. Cl. ..................................... 280/804; 297/477
[58] Field of Search ................. 297/477, 483; 280/804

[56] References Cited

U.S. PATENT DOCUMENTS

| | | | |
|---|---|---|---|
| 3,882,955 | 5/1975 | Kaneko | 280/804 |
| 4,222,586 | 9/1980 | Takada | 280/804 |
| 4,286,804 | 9/1981 | Maekawa | 280/804 |
| 4,313,622 | 2/1982 | Suzuki | 280/804 |
| 4,325,569 | 4/1982 | Suzuki | 280/804 |

Primary Examiner—Douglas C. Butler
Assistant Examiner—John A. Carroll
Attorney, Agent, or Firm—Parkhurst & Oliff

[57] ABSTRACT

An automatic seatbelt system in which a pair of sprocket wheels are driven by a single driving motor to move both shoulder and lap webbings in response to an occupant entering or leaving a vehicle. A flexible shoulder tape is connected to the shoulder webbing through a guide member slidable along a roof side of the vehicle, and extends along a vehicle body to mesh with one of the sprocket wheel. A flexible lap tape is connected to the lap webbing through a guide member slidable along an inner surface of a vehicle door, and extends along the vehicle door and body to mesh with the other of the sprocket wheel. When the sprocket wheels rotate, both shoulder and lap seatbelt webbings are simultaneously moved through the tapes toward either the front side of the vehicle to provide an enough space for the occupant to enter the vehicle, or the rear side of the vehicle to place the webbings over the occupant at a seat.

4 Claims, 14 Drawing Figures

FIG.5
FIG.6
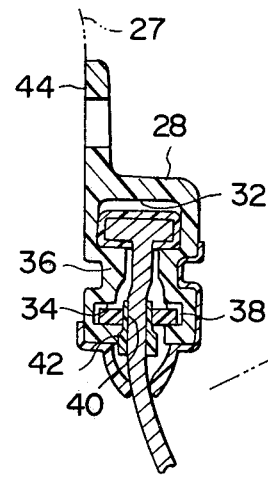
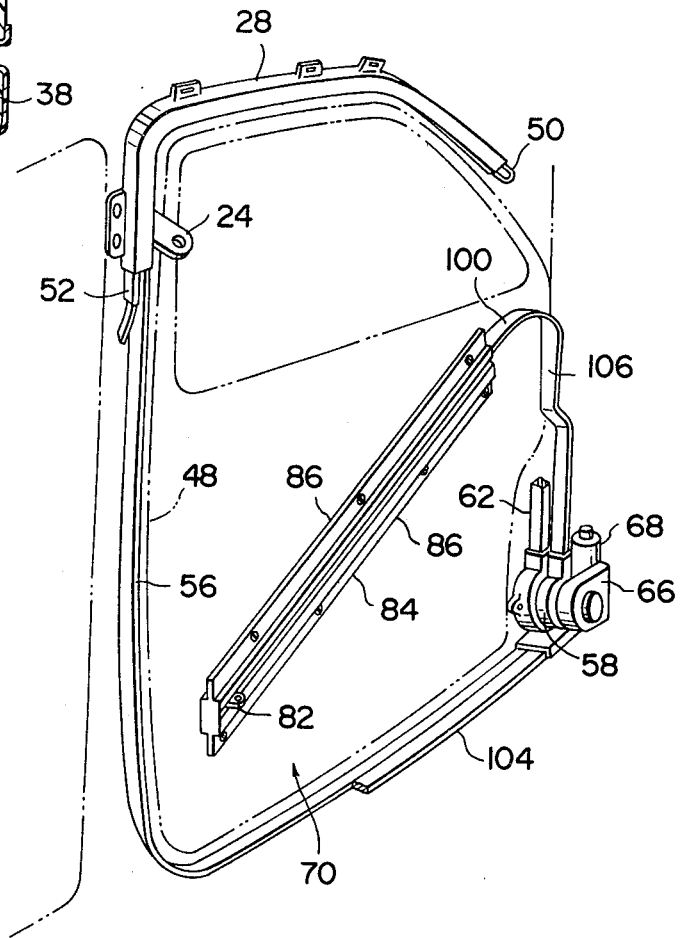

AUTOMATIC SEATBELT SYSTEM

BACKGROUND OF THE INVENTION

1. Field of the Invention

This invention relates to a seatbelt system for protecting an occupant in an emergency situation of a vehicle, and more particularly to an automatically fastening seatbelt system for automatically fastening webbings about the occupant.

2. Description of the Prior Art

Heretofore, there has been proposed an automatically fastening seatbelt system for automatically fastening webbings about an occupant upon his seating at a seat such a type that a shoulder or lap webbing is moved in the longitudinal direction of the vehicle by a driving force of an electric motor, so that the occupant can be brought into an automatically webbing fastened state.

However, in this conventional automatically fastening seatbelt system, in order to automatically bring the occupant into a three-point fastened state, it has been necessary to provide at least two electric motors per occupant, namely four motors for front seats for moving the shoulder webbing and lap webbing, resulting in raised manufacture costs, increased weight and reduced compartment space. When only one motor has been used in the conventional system, either a shoulder webbing or a lap webbing is moved, thus causing a hindrance to comfortable and smooth webbing fastening action for the occupant due to the other webbing not moved by the motor.

SUMMARY OF THE INVENTION

The present invention has been developed to obviate the above-described disadvantage of the prior art and has as its object the provision of an automatically fastening seatbelt system in which both a shoulder webbing and a lap webbing are driven by a single electric motor, thereby enabling to automatically fasten the webbings about an occupant.

In the automatic seatbelt system according to the present invention, a single driving means, for example, an electric motor, rotates a first and second sprocket wheels with which a flexible shoulder and lap tapes are meshed, respectively. The shoulder tape extends along a vehicle body, for example, a center pillar, and is connected to a shoulder guide member holding one end of a shoulder seatbelt webbing. The guide member is guided slidably along a shoulder guide rail laid on a roof side of the vehicle body. The lap tape extends along the vehicle body and a door to be connected to a lap guide member holding one end of a lap seatbelt webbing. The lap guide member is guided slidably along a lap guide rail laid on an inner surface of the door.

BRIEF DESCRIPTION OF THE DRAWINGS

FIG. 5 is a sectional view taken along the line V—V in FIG. 2;

FIG. 6 is a perspective view showing only the essential portions of FIG. 1;

DETAILED DESCRIPTION OF THE PREFERRED EMBODIMENT

Figure 1:
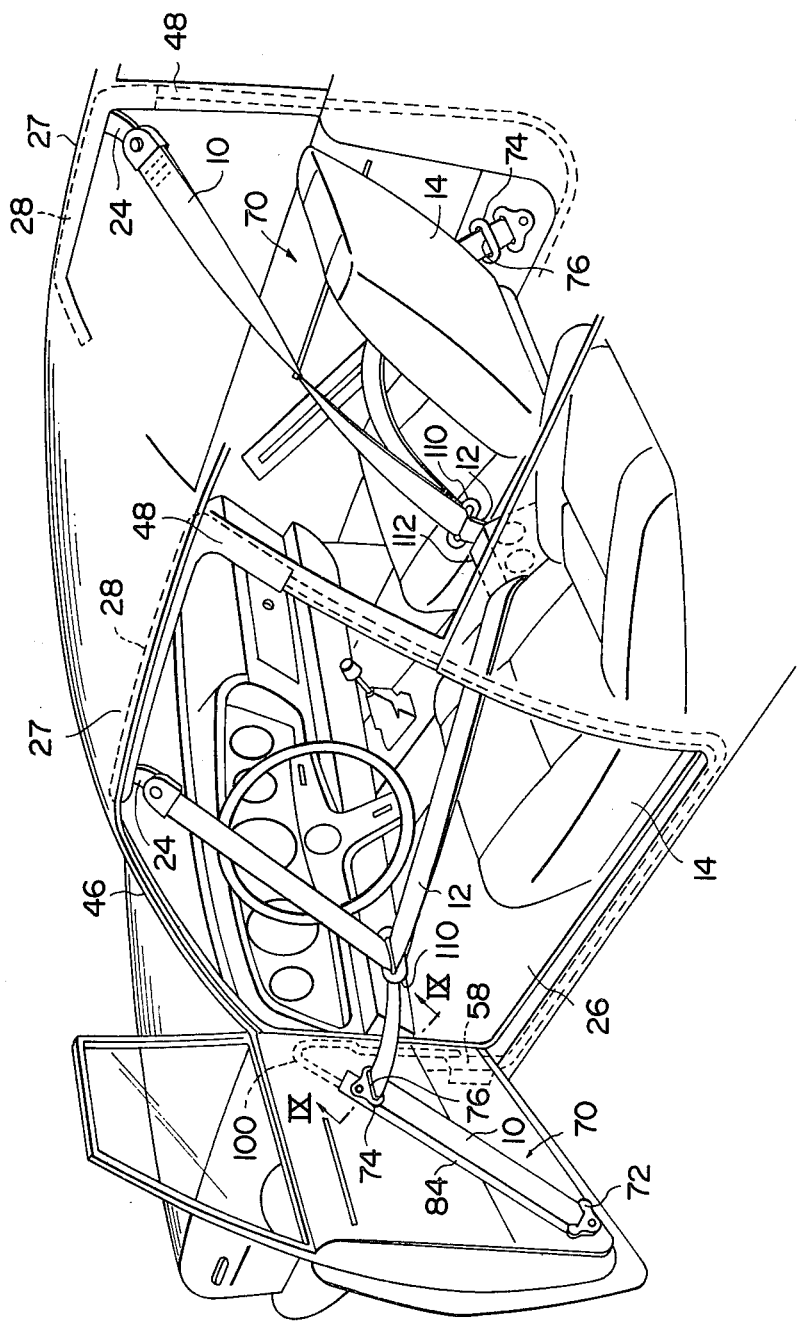
FIG. 1 is a perspective view showing a first embodiment of the automatically fastening seatbelt system according to the present invention.

Description will hereunder be given of the embodiments of the present invention. FIG. 1 shows a first embodiment of the seatbelt system according to the present invention, in which an occupant seated on a seat 14 is automatically brought into a three-point webbing fastened state by use of an outer webbing 10 and an inner webbing 12.

Figure 3:
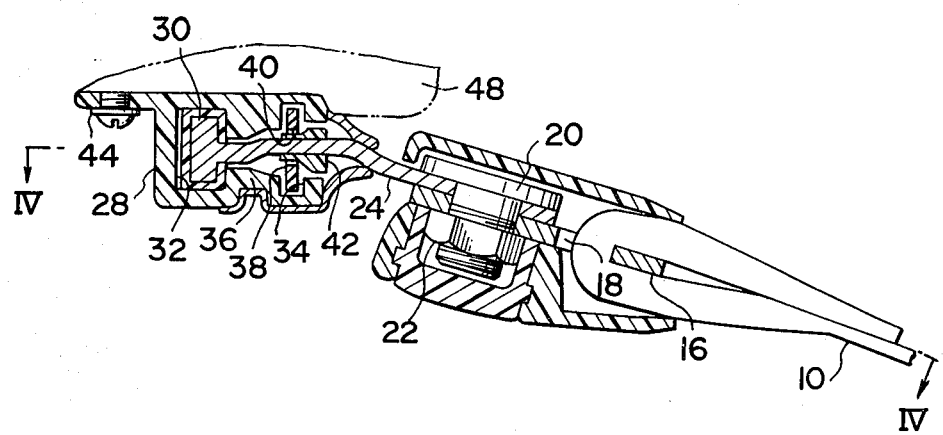
FIG. 3 is a sectional view taken along the line III—III in FIG. 2.

As shown in FIG. 3, one end of the outer webbing 10 is turned back at an opening 18 of an anchor plate 16, and then, sewn to itself. This anchor plate 16 is solidly secured to a shoulder guide member or shoulder guide plate 24 by means of a bolt 20 and nut 22.

This shoulder guide plate 24 is adapted to move in the longitudinal direction of the vehicle, being guided by a shoulder guide rail 28 laid along a roof side 27 of the vehicle body in the longitudinal direction of the vehicle. Detailed description will now be given of the relationship between this shoulder guide plate 24 and the shoulder guide rail 28. As shown in FIGS. 3 and 5, the shoulder guide rail 28 has substantially a U-shaped cross section in the longitudinal direction, and is provided therein with a support groove 32 and a slide groove 34, which are substantially in parallel to each other. An enlarged head 30 of the shoulder guide plate 24 is disposed in the support groove 32, and a neck portion 36 between the support groove 32 and slide groove 34 has a narrower width than that of the support groove 32 to prevent the shoulder guide plate 24 from falling off the shoulder guide rail 28.

Figure 7:
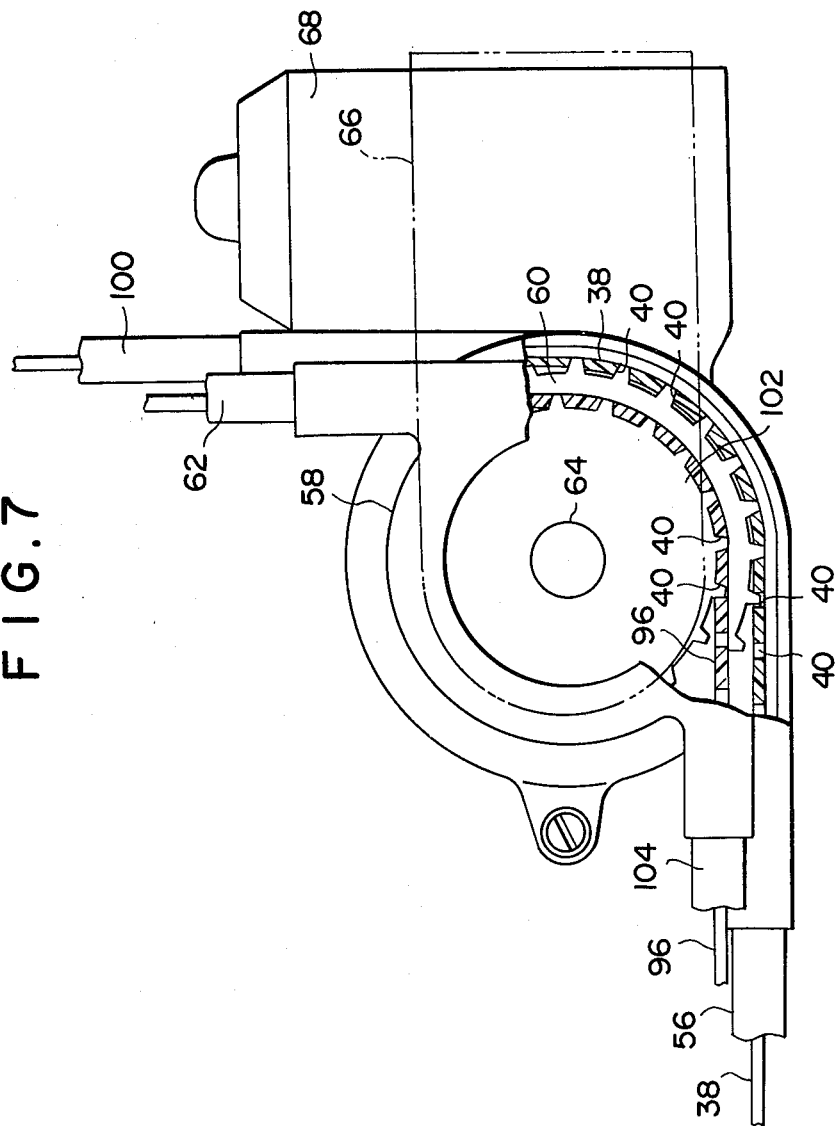
FIG. 7 is a partly broken away front view showing a sprocket housing.
Figure 8:
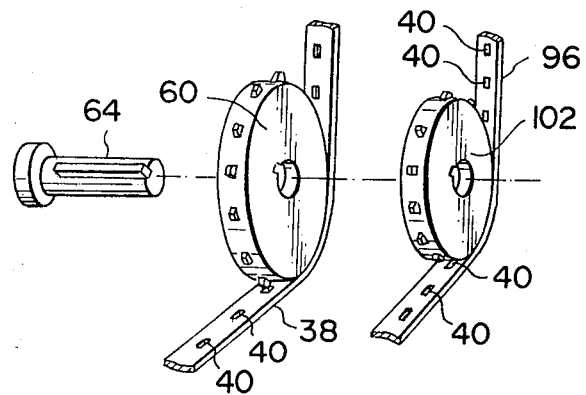
FIG. 8 is a disassembled perspective view showing essential portions of FIG. 7.

A shoulder flexible tape 38 also shown in FIGS. 7 and 8 is received in the slide groove 34 and adapted to slide on the shoulder guide rail 28 in the longitudinal direction thereof. This flexible tape 38 is of a relatively thick wall tape made of a synthetic resin material and capable of imparting both a tensile force and a compressive force in the slide groove 34 in the longitudinal direction thereof. This tape 38 has a plurality of rectangular openings 40 at suitable intervals in the longitudinal direction thereof. Extending through one of these rectangular openings 40 is the shoulder guide plate 24 which is covered by a bush 42.

Consequently, the movement of this flexible tape 38 along the slide groove 34 in the longitudinal direction of the shoulder guide rail 28 causes the shoulder guide plate 24 to move in the longitudinal direction of the guide rail accordingly.

Figure 2:
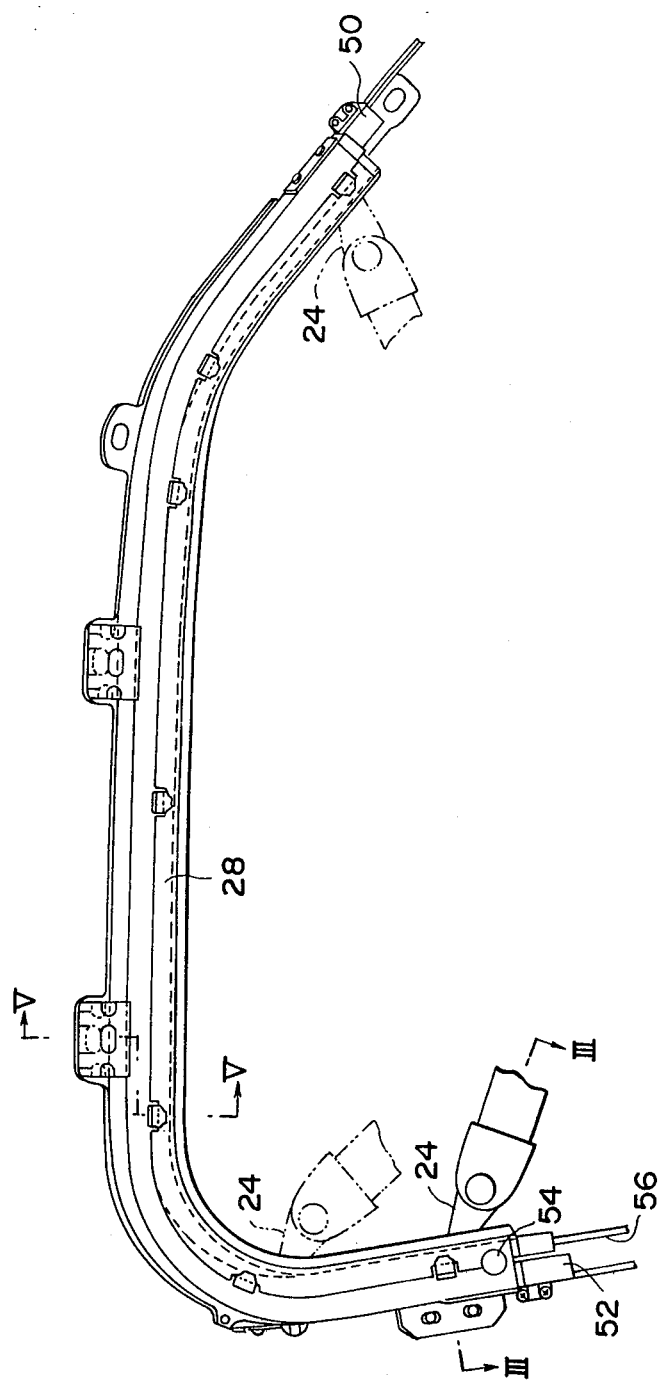
FIG. 2 is a front view showing the shoulder guide rail.
Figure 4:
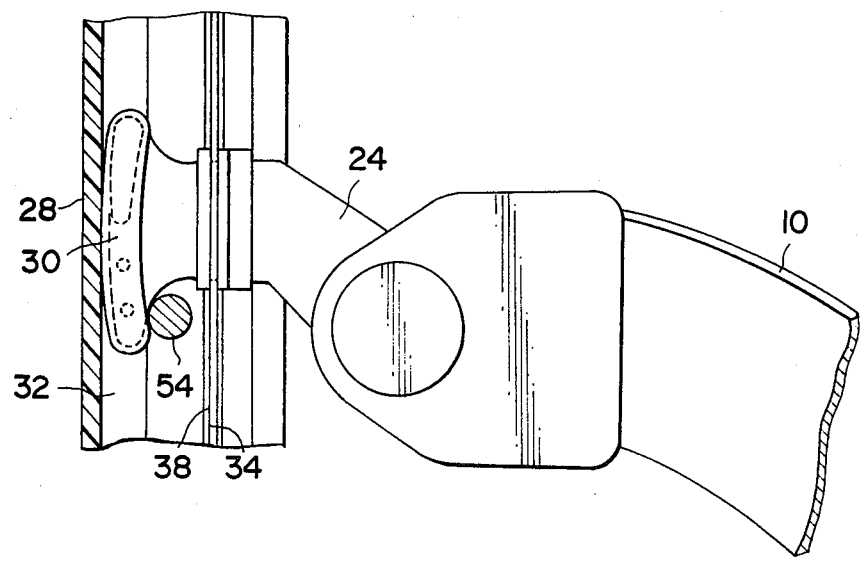
FIG. 4 is a sectional view taken along the line IV—IV in FIG. 3.

FIG. 2 is an enlarged front view showing the shoulder guide rail, in which the right side of the drawing indicates the front side of the vehicle and the left side thereof indicates the rear side of the vehicle. As shown in FIG. 2, the shoulder guide rail 28 has mounting brackets 44 projecting from suitable portions thereof, through which the shoulder guide rail 28 is solidly secured to the roof side of the vehicle body, the forward end portion thereof (as viewed in the vehicle) descends along a front pillar 46 of the vehicle body, and the rear end portion thereof is bent substantially perpendicularly to the intermediate portion thereof and descends along a center pillar 48 of the vehicle body. Here, as shown by solid line in FIG. 2, when the shoulder guide plate 24 reaches the rear end of the guide rail 28, the position thus reached is an automatically webbing fastening position for the occupant, and, when the shoulder guide plate 24 reaches the forward end as shown in FIG. 1, the position thus reached is an automatically webbing unfastening position for the occupant. Limit switches 50 and 52 are provided at the forward and rear lower ends of the guide rail 28, respectively, to detect the presence of the shoulder guide plate 24 at the forward end as shown by solid line in FIG. 2 and at the rear lower end as shown by two dotted line in FIG. 2. An anchor pin 54 (referring to FIG. 4) is solidly secured to a position adjacent the rear lower end of the shoulder guide rail 28 and adapted to engage with the enlarged head 30 of the guide plate 24 which has moved to the rear end portion of the vehicle so as to impart the tension in the outer webbing 10 in the emergency situation to the anchor pin 54.

A track 56 for guiding the tape 38 is positioned continuously along the vehicle body. More specifically, one end of the track 56 is fixed to the rear end portion of the shoulder guide rail 28. As shown in FIGS. 6 and 7, the other end of this track 56 is connected to a sprocket housing 58 secured to the lower portion of the front pillar 46, and the flexible tape 38 is guided from the guide rail 28 to the sprocket housing 58 to be meshed with a large sprocket wheel 60. Further, an auxiliary track 62 is connected to the other side of this sprocket housing 58 to guide the flexible tape 38 continuously extending from the sprocket housing 58.

The large sprocket wheel 60 thus being meshed with the flexible tape 38 has a shaft 64 connected to a motor 68 through a gear box 66. The motor 68 is adapted to drive the large sprocket wheel 60 to move the flexible tape 38 being meshed with the large sprocket wheel 60 in the longitudinal direction, whereby the shoulder guide plate 24 is moved along the guide rail 28.

Figure 9:
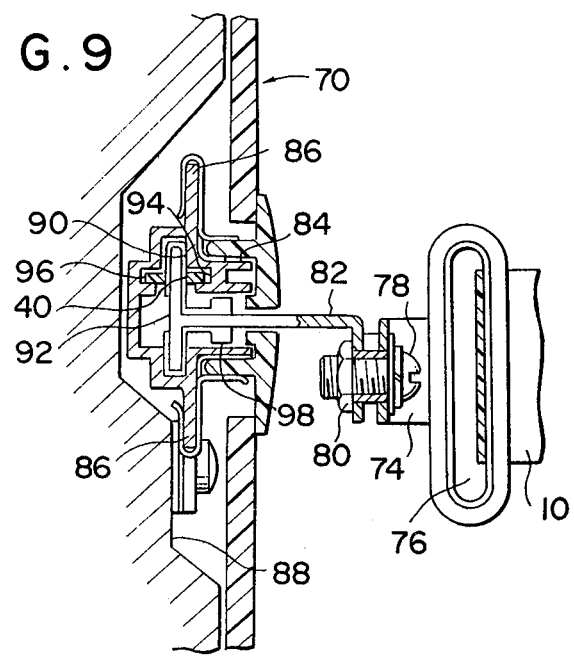
FIG. 9 is a sectional view taken along the line IX—IX of FIG. 1.

The other end of the outer webbing 10 is turned back by an anchor plate 72 solidly secured to the lower rear portion of a door 70 and engaged therewith. The intermediate portion of this outer webbing 10, as shown in FIG. 9, extends through an opening 76 of a ring plate 74. The ring plate 74 is pivotally supported on a lap guide plate 82 through a bolt 78 and nut 80. This lap guide plate 82 is adapted to be guided by a lap guide rail 84 laid along the door 70.

Description will now be given of this lap guide rail 84. This lap guide rail 84, as shown in FIG. 6 in detail, is disposed from the lower rear portion to the upper forward portion of the door 70 in a straight line or a curved line having a suitable curvature, and, as shown in FIG. 9, a flange 86 of the lap guide rail 84 is fastened to a reinforcing member 88 of the door through screws. Formed in this lap guide rail 84 in a cross section perpendicular to the longitudinal direction thereof is a support groove 90, in which an enlarged portion 92 of the lap guide plate 82 is disposed. Additionally, formed in a direction perpendicularly intersecting this support groove 90 is a slide groove 94 incorporating therein a lap flexible tape 96. This lap flexible tape 96 is similar in shape to the shoulder flexible tape 38, and has a plurality of rectangular openings 40 similarly. A portion of the lap guide plate 82 is inserted through one of these rectangular openings to engage the flexible tape 96. Consequently, when this flexible tape 96 moves in the slide groove 94 of the lap guide rail 84, the lap guide plate 82 moves back and forth along the lap guide rail 84. To decrease the frictional force generated between the lap guide plate 82 and lap guide rail 84 during this movement, a shoe 98 is secured to the lap guide plate 32.

Here, as indicated at the driver's seat side in FIG. 1, when the lap guide plate has been moved to the forward end portion in the vehicle, the intermediate portion of the outer webbing 10 is moved in the forward direction in the vehicle through the ring plate 74, thereby to not disturb the actions of legs of the occupant when he enters or leaves the vehicle. As indicated at the side of the other seat in FIG. 1, when the lap guide plate has been moved along the lap guide rail 84 to the rear end portion in the vehicle, the outer webbing 10 is automatically placed over the occupant.

A track 100 for guiding the lap flexible tape 96 is disposed between the lap guide rail 84 and sprocket housing 58. More specifically, connected to the forward end portion, as viewed in the vehicle, of the lap guide rail 84 is one end of the track 100 communicated with the slide groove 94. The other end of this track is connected to the aforesaid sprocket housing 58, where the lap flexible tape 96 is meshed with a small sprocket wheel 102. This small sprocket wheel 102 is similar in shape to the large sprocket wheel 60, however, smaller in diameter than the large sprocket wheel 60, and fixed on the shaft 64 so as to rotate together with the large sprocket wheel 60. In addition, the sprocket housing 58 is further connected thereto with an auxiliary track 104, so that the lap flexible tape extending rearward from the sprocket housing 58 is guided by the auxiliary track 104.

As described above, in this embodiment, the sprocket wheels 60 and 102 are different in diameter from each other, so that the shoulder guide plate 24 and the lap guide plate 82 can be varied in value of movement when driven by the motor 68, thus enabling both guide plates to move by necessary distances, respectively.

In addition, the motor 68 is adapted to be rotated in normal or reverse direction in accordance with the result of the detection as to whether the occupant enters or leaves the vehicle. For an example, when the door is opened by means of a door switch, not shown, the motor 68 is rotated in the clockwise direction in FIG. 7 by means of operation of a door switch, not shown, and when the door is closed, the motor 68 is moved in the counterclockwise direction by means of operation of the door switch, and the supply of electric current to the motor 68 is cut off through the action of the limit switches 50 and 52 provided on the shoulder guide rail 28, when the door is both opened and closed.

Furthermore, a portion of the track 56 between the front pillar 46 and the door 70 is formed into a stepped portion 106, so that the change in interval between the door 70 and the front pillar 46 can be accommodated when the door is opened or closed.

Figure 10:
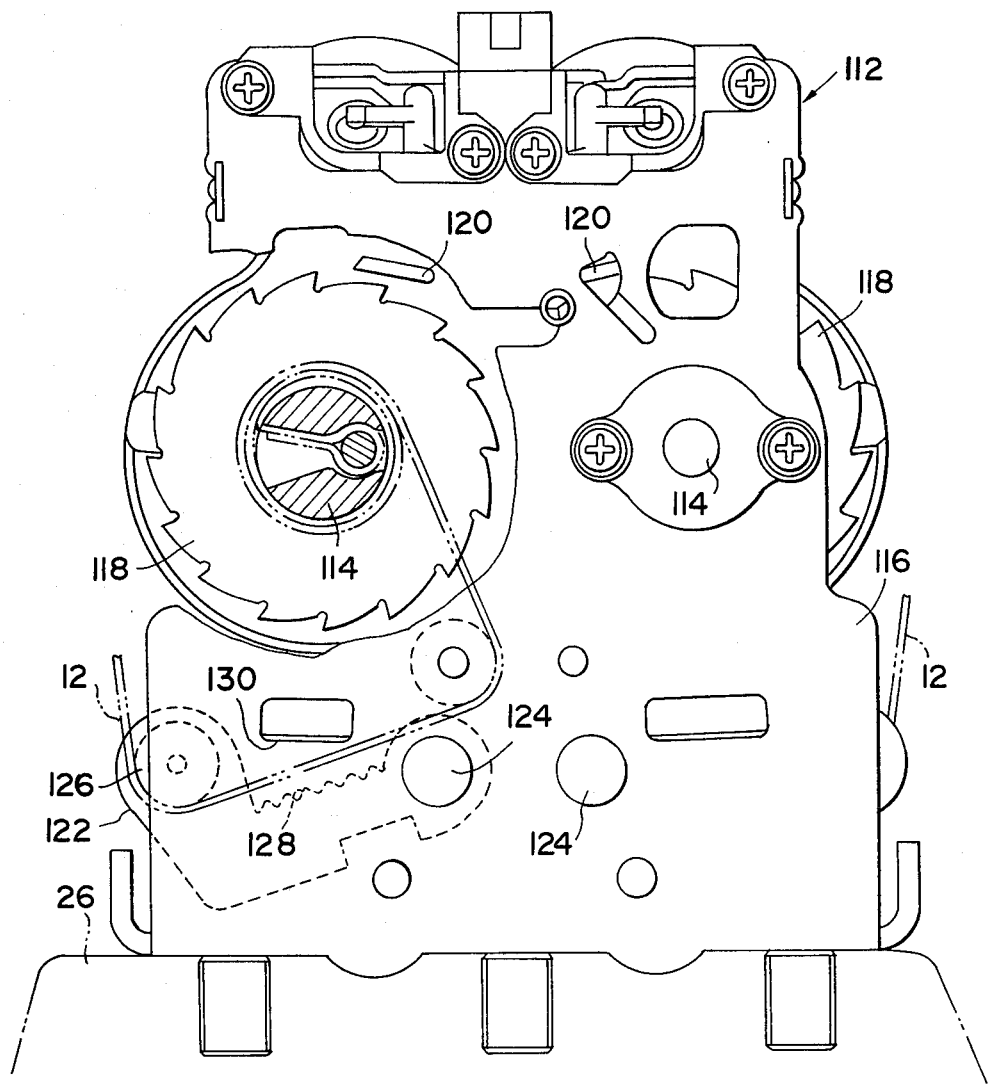
FIG. 10 is a front view showing a retractor.

As shown in FIG. 1, a portion of the outer webbing 10 between the shoulder guide plate 24 and the lap guide plate 82 extends through a through-ring 110. This through-ring 110 is engaged with the forward end portion of the inner webbing 12. The base portion of this inner webbing 12 is wound up by a takeup shaft 114 (Refer to FIG. 10) of a retractor 112 secured to a substantially central portion of a vehicle floor. This takeup shaft 114 is pivotally supported on a frame 116 solidly secured to the floor and urged in a direction of winding up the inner webbing 12 by an urging force of a spiral spring, not shown.

Solidly secured to this takeup shaft 114 is a ratchet wheel 118 which is opposed to a pawl 120 pivotally supported on the frame 116. This pawl 120 is adapted to be operated by an acceleration sensor such as a pendulum, not shown, to be meshed with the ratchet wheel 118 in an emergency situation of the vehicle. Both pawl 120 and ratchet wheel 118 serve as an inertia lock mechanism for interrupting the webbing unwinding rotation of the takeup shaft 114 in an emergency situation of the vehicle.

Furthermore, a lever 122 is pivotally supported on this frame 116 through a shaft 124, and the inner webbing 12 is wound around a roller 126 provided at the forward end portion of the lever 122. Such a consideration is given that this lever 122 is rotated as the tensile force of the inner webbing 12 is increased in an emergency situation, whereby wave-shaped ridges 128 approach a block fixed on the frame 116 to clamp the intermediate portion of the inner webbing therebetween, so that the occupant can be brought into a webbing fastened state quickly and tightly.

In addition, a pair of takeup shafts and also a pair of associated parts are provided on this retractor 112, so that the retractor 112 can wind up both inner webbings for both front seats simultaneously.

Description will hereunder be given of operation of this embodiment with the abovedescribed arrangement.

In FIG. 1, the driver's seat is shown in a state of the door being opened for allowing the occupant to enter the vehicle, in which the shoulder guide plate 24 and lap guide plate 82 are moved to the forward end portions in the vehicle. Consequently, a space for allowing the occupant to enter or leave the vehicle is formed between the outer webbing 10 and the seat 14, so that the actions of legs of the occupant are not disturbed.

When the door 70 is closed after the occupant is seated, the motor 68 rotates the large sprocket wheel 60 and small sprocket wheel 102 in the counterclockwise direction simultaneously, whereby the shoulder flexible tape 38 being driven by the large sprocket wheel 38 moves the shoulder guide plate 24 rearwards in the vehicle to the vertical portion of the shoulder guide rail 28 as shown in a state indicated by solid lines in FIG. 2. When the shoulder guide plate 24 is moved to the rear end portion in the vehicle as described above, the limit switch 54 detects the state of the shoulder guide plate 24, whereby the motor is stopped in rotation.

Simultaneously with this, the small sprocket wheel 102 drives the lap flexible tape 96, whereby the lap guide plate 82 is moved along the lap guide rail 84 rearwards in the vehicle, so that the flexing of the outer webbing can be removed by means of the lap guide plate 82, thereby enabling the retractor 112 to wind up the inner webbing 12 by the urging force thereof. As a result, the through-ring 110 approaches the retractor 112, whereby the outer webbing 10 is placed over the occupant closely.

The outer webbing 10 is automatically fastened about the occupant as described above, the occupant is automatically brought into a three-point seatbelt fastened state by a portion of the outer webbing between the shoulder guide plate 24 and the through-ring 110 as a shoulder webbing and another portion of the outer webbing between the lap guide plate 82 and the through-ring 110 as a lap webbing.

Thereafter, during normal running condition of the vehicle, the retractor 112 makes it possible to unwind the inner webbing 12, so that the occupant may obtain a desirable driving posture. However, when the vehicle falls into an emergency situation such as a collision, the inertia lock mechanism of the retractor 112 is operated, whereby the occupant is restrained by the outer webbing 10 and the inner webbing 12, thus enabling to protect the occupant safely.

In this case, one end of the outer webbing 10 is positively supported on the door 70 through the anchor plate 72, and the other end thereof has the enlarged head 30 of the shoulder guide plate 24 disposed at the vertical portion of the shoulder guide rail 28, whereby the anchor plate 72 does not move forwards in the vehicle, so that the occupant can be secured in a restrained state. In addition, the enlarged head 30 of the shoulder guide plate 24 is engaged with the anchor pin 54, so that the shoulder guide plate 24 can be prevented from moving forwards in the vehicle, even when the support groove 32 of the shoulder guide plate 84 is deformed.

When the occupant leaves the vehicle and opens the door, the motor 68 is rotated in the reverse direction, and, with an action opposite to that described above, the shoulder guide plate 24 and lap guide plate 82 are moved forwards in the vehicle to bring about the state indicated by the driver's seat in FIG. 1, whereby the webbings are automatically released from the occupant, so that the occupant can readily leave the vehicle.

Figure 11:
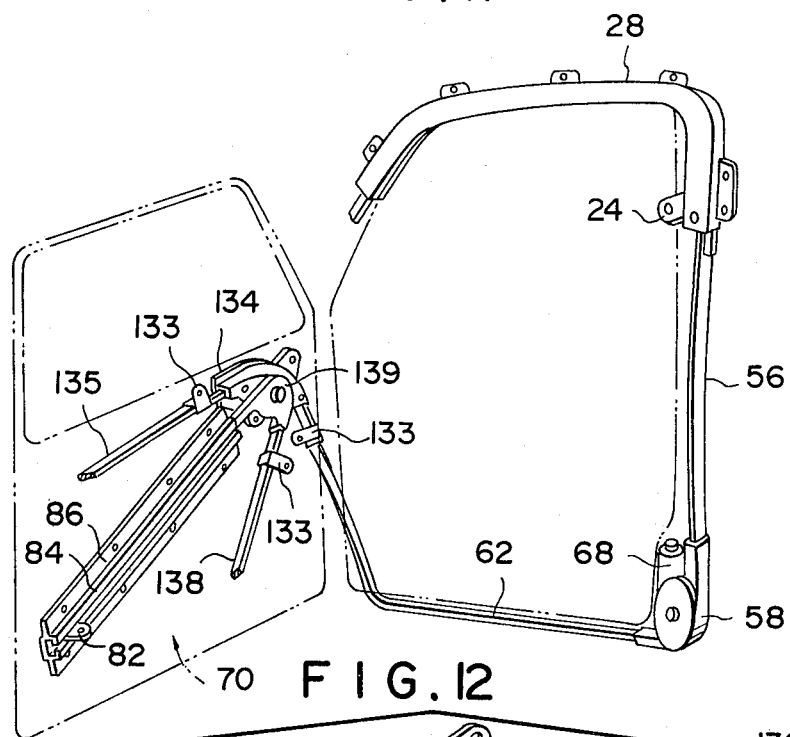
FIG. 11 is a perspective view showing the essential portions of a second embodiment of the present invention.
Figure 12:
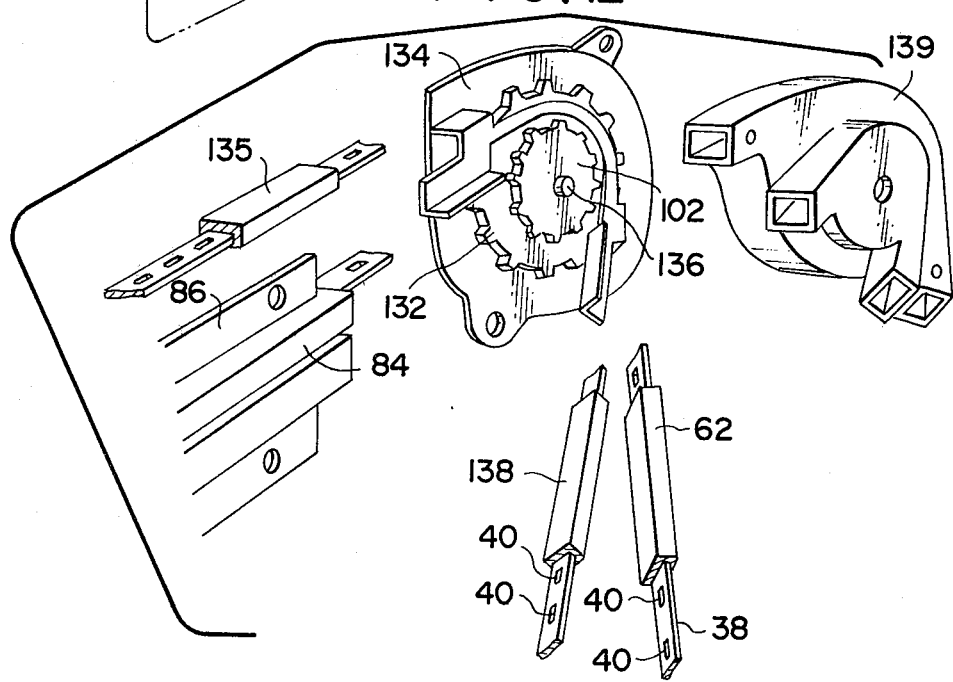
FIG. 12 is a perspective view showing the inner construction of a motorless sprocket housing in a disassembled state of the second embodiment.

Next, FIGS. 11 and 12 show a second embodiment of the present invention, in which the large and small sprocket wheel are secured to shafts different from each other and a connecting sprocket wheel 132 is provided.

In this embodiment, the sprocket housing 58 is disposed at the lower portion of the center pillar 48, and the auxiliary track 62 extends forwardly from the sprocket housing 58 as viewed in the vehicle and led into the door 70 in the same manner as the track 108 in the preceding embodiment. Further, a portion close to the forward end of this auxiliary track 62 is fixed to the door through a clamp 133 and connected to a motorless sprocket housing 134 in the door 70. The shoulder flexible tape 38 guided by this auxiliary track 62, as shown in FIG. 12, is meshed with the connecting sprocket wheel 132 disposed in the motorless sprocket housing 134 so as to impart the rotation of the motor to this connecting sprocket wheel 132, and the flexible tape 38 is continuously led into a track 135 connected to the sprocket housing 134.

The connecting sprocket wheel 132 is connected to the small sprocket wheel 102 coaxially fixed onto a shaft 136, and meshed with the lap flexible tape 96. One side of this lap flexible tape 96 is guided to the lap guide rail 84 and the other side thereof is led to a track 138 connected to the sprocket housing 134. In addition, the sprocket wheel 132 is covered with a cover 139.

Consequently, in this embodiment, when the motor is driven, the shoulder flexible tape 38 drives the shoulder guide plate 24 and rotates the connecting sprocket wheel 132 so as to rotate the small sprocket wheel 102 through the connecting sprocket wheel 132, whereby the lap flexible tape 96 meshed with this small sprocket wheel 102 is moved, so that the lap webbing is driven by the lap guide plate.

In this embodiment, the sprocket wheel directly driven by the motor and the connecting sprocket wheel 132 are spaced apart from each other, so that both sprocket wheels can be easily assembled to the vehicle body. More specifically, the shoulder guide rail 28, sprocket housing 58, track 62 and the like are secured to the roof side 27 and center pillar 48, respectively, while the motorless sprocket housing 134 is assembled to the door 70. Thereafter, the forward end portion of the track 62 is led into the door 70 and made communicated with the sprocket housing 134, and the tape 38 is made meshed with the sprocket wheel 132. Thereafter, the lap guide rail may be assembled to the door 70, and the tape after being made meshed with the sprocket wheel 102, is led into the track 139 and the cover 139 is fastened thereto, thus enabling to complete the assembling work. As a result, this embodiment, although bulkier than the first embodiment, make it simplified to assemble.

Figure 13:
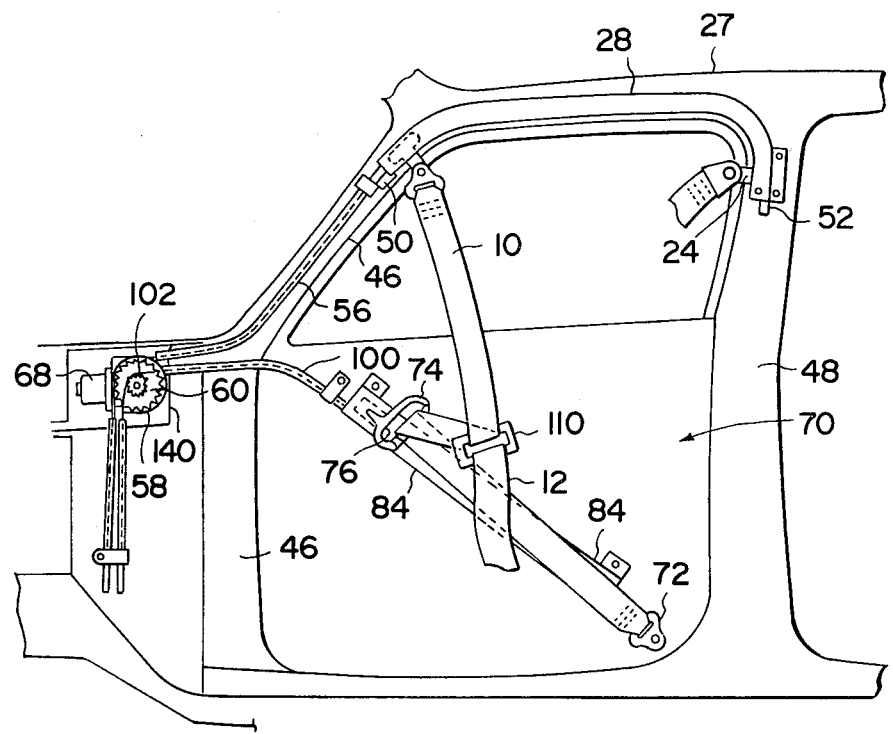
FIG. 13 is a sectional view from lateral direction of the vehicle showing a third embodiment of the present invention.

Next, FIG. 13 is a side view showing a third embodiment of the present invention, in which the sprocket housing 58 is secured into a cowl box 140. This sprocket housing 58 has a substantially same construction as that in the first embodiment, and the large sprocket wheel 60 and small sprocket wheel 102 are fixed on the same shaft.

Consequently, in this embodiment, the track 56 for the shoulder tape extends from the cowl box 140, through the front pillar 46 and is connected to the forward end portion of the shoulder guide rail 28 as viewed in the vehicle. Additionally, the track 100 for the lap tape extends from the cowl box 140, travers the front pillar 46 and is connected to the forward end portion of the lap guide rail 84 as viewed in the vehicle.

The arrangements other than those described above are similar to the first embodiment. However, in this embodiment, the motor and the sprocket housing are incorporated in the cowl box, so that noises generated by the motor can be shut off from the interior of the compartment of the vehicle.

Figure 14:
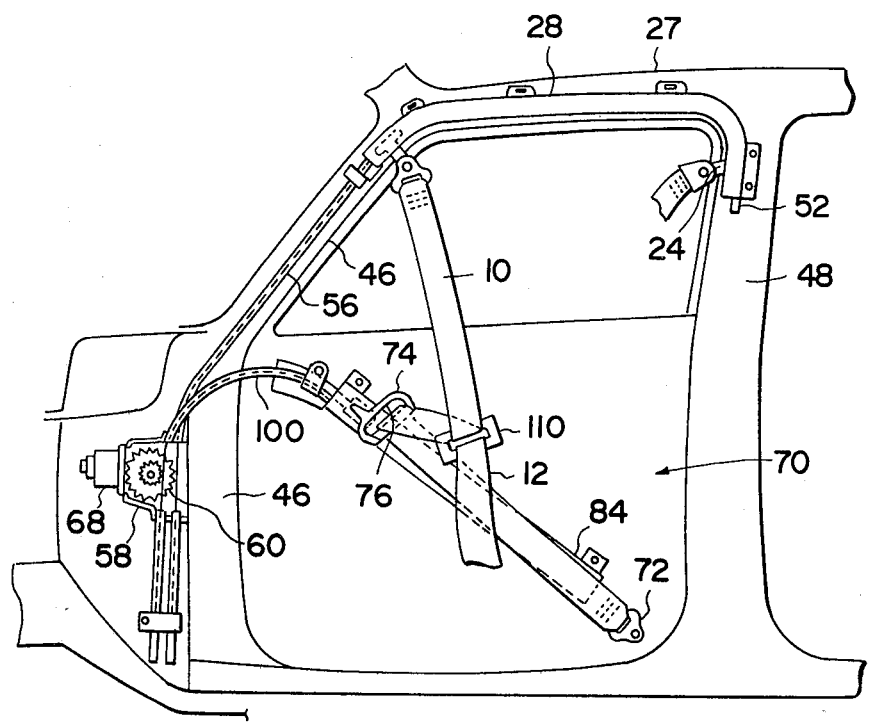
FIG. 14 is a sectional view from lateral direction of the vehicle showing a fourth embodiment of the present invention.

Next, FIG. 14 shows a fourth embodiment of the present invention, in which, as different from the preceding embodiments, the sprocket housing 58 is provided in the front pillar 46. The arrangements other than this are similar to those in the preceding embodiments.

Consequently, in this embodiment, the noises of the motor can be prevented from being transmitted into the compartment of the vehicle, while the assembling work can be carried out easily as compared with the preceding embodiments.

In addition, also in the abovedescribed third and fourth embodiments, the flexible tapes and tracks for transmitting the driving force of the motor are flexible enough to extend along the configuration of the vehicle body, and the driving force of the motor can be reliably transmitted.

As has been described in the respective embodiments, according to the present invention the first and the second sprocket wheels, both of which are driven by the motor are provided, whereby these sprocket wheels are adapted to move the lap guide plate and the shoulder guide plate respectively through the flexible tapes, so that such an outstanding advantage can be offered that only one single motor can drive both the shoulder webbing and lap webbing, thereby enabling to automatically bring the occupant into the three-point seatbelt system.

What is claimed is:

1. An automatic seatbelt system for automatically fastening shoulder and lap seatbelt webbings about an occupant in a motor vehicle, comprising:
    a shoulder guide rail substantially extending in a longitudinal direction of the vehicle along a roof side portion of a vehicle body;
    a shoulder guide member slidably coupled with said shoulder guide rail and guiding an end portion of the shoulder seatbelt webbing;
    a lap guide rail substantially extending in the longitudinal direction of the vehicle along an inner surface of a vehicle door;
    a lap guide member slidably coupled with said lap guide rail and guiding an end portion of the lap seatbelt webbing;
    a first sprocket wheel fixed to the vehicle body;
    a second sprocket wheel fixed to the vehicle body;
    a single driving means for rotating said first and second sprocket wheels;
    a flexible shoulder tape having a plurality of openings along the longitudinal direction thereof, said shoulder tape being connected with said shoulder guide member and extending continuously along the vehicle body at least to said first sprocket wheel with which said shoulder tape is meshed; and
    a flexible lap tape having a plurality of openings along the longitudinal direction thereof, said lap tape being connected with said lap guide member and extending continuously along the vehicle door and vehicle body at least to said second sprocket wheel with which said lap tape is meshed;
    a sprocket housing storing said first and second sprocket wheels coaxially, said housing being provided at the lower end portion of a front pillar of the vehicle;
    a first track for slidably storing said shoulder tape, said first track extending along the vehicle body at least from the rear end of said shoulder guide rail to said sprocket housing via a center pillar of the vehicle;
    a second track for slidably storing said lap tape, said second track extending along the vehicle door and vehicle body at least from the forward end of said lap guide rail to said sprocket housing, said second track having a stepped portion between the vehicle door and the vehicle body, whereby said stepped portion absorbs the opening and closing movements of the vehicle door.

2. An automatic seatbelt system for automatically fastening shoulder and lap seatbelt webbings about an occupant in a motor vehicle, comprising:
    a shoulder seatbelt webbing defined by an upper portion having a single outer webbing extending from a roof side portion to a rear lower portion of a door of the vehicle and a lap seatbelt webbing defined by a lower portion of said outer webbing;
    a shoulder guide rail substantially extending in a longitudinal direction of the vehicle along the roof side portion of a vehicle body;

a shoulder guide member slidably coupled with said shoulder guide rail and guiding an end portion of the shoulder seatbelt webbing;

a lap guide rail substantially extending in the longitudinal direction of the vehicle along an inner surface of the vehicle door;

a lap guide member slidably coupled with said lap guide rail and guiding an end portion of the lap seatbelt webbing;

a first sprocket wheel fixed to the vehicle body;

a second sprocket wheel fixed to the vehicle body;

a single driving means for rotating said first and second sprocket wheels;

a flexible shoulder tape having a plurality of openings along the longitudinal direction thereof, said shoulder tape being connected with said shoulder guide member and extending continuously along the vehicle body at least to said first sprocket wheel with which said shoulder tape is meshed; and a flexible lap tape having a plurality of openings along the longitudinal direction thereof, said lap tape being connected with said lap guide member and extending continuously along the vehicle door and vehicle body at least to said second sprocket wheel with which said lap tape is meshed.

3. An automatic seatbelt system as set forth in claim 2, further comprising a through-ring slidably coupled with the intermediate portion of said outer webbing; an inner webbing connected with said through-ring; and a retractor winding said inner webbing and fixed to a center portion of the vehicle body.

4. An automatic seatbelt system for automatically fastening shoulder and lap seatbelt webbings about an occupant in a motor vehicle, comprising:

a shoulder guide rail substantially extending in a longitudinal direction of the vehicle along a roof side portion of a vehicle body;

a shoulder guide member slidably coupled with said shoulder guide rail and guiding an end portion of the shoulder seatbelt webbing;

a lap guide rail substantially extending in the longitudinal direction of the vehicle along an inner surface of a vehicle door;

a lap guide member slidably coupled with said lap guide rail and guiding an end portion of the lap seatbelt webbing;

a first sprocket wheel provided at a lower end of a center pillar of the vehicle body;

a single driving means for rotating said first sprocket wheel;

a second sprocket wheel provided on the vehicle door;

a connecting sprocket wheel coaxially and rotatably connected with said second sprocket wheel;

a flexible shoulder tape having a plurality of openings along the longitudinal direction thereof, said shoulder tape being connected with said shoulder guide member and extending continuously along the vehicle body, through said first sprocket wheel with which said shoulder tape is meshed, at least to said connecting sprocket wheel with which said shoulder tape is meshed; and a flexible lap tape having a plurality of openings along the longitudinal direction thereof, said lap tape being connected with said lap guide member and meshed with said second sprocket wheel;

a first track for slidably storing said shoulder tape, said first track extending along the vehicle body at least from the rear end of said shoulder guide rail to said connecting sprocket wheel via a center pillar of the vehicle body; and a second track for slidably storing said lap tape.

* * * * *